(12) United States Patent
Sun et al.

(10) Patent No.: US 8,208,499 B2
(45) Date of Patent: Jun. 26, 2012

(54) FRAMING STRUCTURE FOR DIGITAL BROADCASTING AND INTERACTIVE SERVICES

(75) Inventors: Feng-Wen Sun, Germantown, MD (US); Lin-Nan Lee, Potomac, MD (US)

(73) Assignee: DTVG Licensing, Inc., El Segundo, CA (US)

( * ) Notice: Subject to any disclaimer, the term of this patent is extended or adjusted under 35 U.S.C. 154(b) by 1547 days.

(21) Appl. No.: 10/816,385

(22) Filed: Apr. 1, 2004

(65) Prior Publication Data
US 2004/0252725 A1 Dec. 16, 2004

Related U.S. Application Data

(60) Provisional application No. 60/478,376, filed on Jun. 13, 2003, provisional application No. 60/482,111, filed on Jun. 24, 2003, provisional application No. 60/482,117, filed on Jun. 24, 2003.

(51) Int. Cl.
*H04J 3/06* (2006.01)
(52) U.S. Cl. ........ 370/514; 370/510; 370/278; 370/316; 370/324; 375/260; 375/364; 375/365; 375/279; 375/329; 375/308
(58) Field of Classification Search .................. 375/364, 375/365, 279, 329, 308, 260; 370/514, 510, 370/278, 316, 324
See application file for complete search history.

(56) References Cited

U.S. PATENT DOCUMENTS

| 4,613,825 | A | 9/1986 | Bickley et al. ............... 331/4 |
|---|---|---|---|
| 5,241,549 | A | 8/1993 | Knowles et al. | |
| 5,282,205 | A * | 1/1994 | Kuznicki ..................... 370/429 |
| 5,627,499 | A * | 5/1997 | Gardner ........................ 332/101 |
| 6,119,263 | A * | 9/2000 | Mowbray et al. ............. 714/781 |
| 6,158,041 | A * | 12/2000 | Raleigh et al. ................ 714/792 |
| 6,493,335 | B1 | 12/2002 | Darcie et al. |
| 6,518,892 | B2 | 2/2003 | Shen et al. .................... 370/343 |
| 6,560,303 | B1 | 5/2003 | Fan et al. |
| 6,631,174 | B1 | 10/2003 | Asahara et al. |
| 6,665,361 | B1 * | 12/2003 | Christodoulides et al. ... 375/364 |
| 6,721,299 | B1 | 4/2004 | Song |
| 6,851,085 | B2 * | 2/2005 | Kim et al. ...................... 714/779 |

(Continued)

FOREIGN PATENT DOCUMENTS

CA  2263280 A1  9/1999

(Continued)

OTHER PUBLICATIONS

Jiang, Y.; Verahrami, Farhad B.; Ting, Wen-Chun; Richmond, Robert L.; Baras, John S.; "Data-Aided ML Parameters for PSK Burst Modems and Their Systolic VLSI Implementations"; 1999 IEEE Global Telecommunications Conference; GlobeCom '99; Rio de Janeiro, Brazil; Dec. 5-9, 1999; pp. 2177-2182; EP000951366.

(Continued)

*Primary Examiner* — Kibrom T Hailu

(57) ABSTRACT

An approach is provided for supporting frame synchronization in a digital broadcast and interactive system. A transmitter includes an encoder that outputs a Low Density Parity Check (LDPC) codeword. The transmitter also includes a framing module generates a LDPC coded frame in response to the LDPC codeword, and appends a physical layer signaling field to the LDPC codeword for specifying modulation and coding information associated with the LDPC coded frame. The physical layer signaling field is encoded with a Forward Error Correction (FEC) code and has an embedded framing structure to assist with frame synchronization. The above arrangement is particularly suited to a digital satellite broadcast system.

19 Claims, 10 Drawing Sheets

U.S. PATENT DOCUMENTS

| | | | |
|---|---|---|---|
| 6,859,503 B2* | 2/2005 | Pautler et al. | 375/299 |
| 6,879,602 B1 | 4/2005 | Sugita et al. | |
| 6,924,753 B2* | 8/2005 | Bretl et al. | 341/50 |
| 6,973,118 B1 | 12/2005 | Ikeda et al. | |
| 7,031,382 B2 | 4/2006 | Hessel et al. | |
| 7,079,574 B2 | 7/2006 | Rafie et al. | 375/232 |
| 7,136,445 B2 | 11/2006 | Houtman | 375/375 |
| 7,158,482 B2* | 1/2007 | Love et al. | 370/252 |
| 7,372,908 B2* | 5/2008 | Miyoshi et al. | 375/260 |
| 2002/0064240 A1 | 5/2002 | Joshi et al. | |
| 2002/0186759 A1 | 12/2002 | Goldstein et al. | |
| 2004/0047433 A1* | 3/2004 | Mogre et al. | 375/308 |
| 2004/0081247 A1* | 4/2004 | Chang et al. | 375/259 |

FOREIGN PATENT DOCUMENTS

| | | |
|---|---|---|
| EP | 1059786 | 12/2000 |
| JP | 05-244144 | 9/1993 |
| JP | 10-10126447 | 5/1998 |
| JP | 11-261579 | 9/1999 |
| JP | 2000-36782 A | 2/2000 |
| JP | 2000-349703 | 12/2000 |
| WO | 0051275 | 8/2000 |

OTHER PUBLICATIONS

Canadian Office Action dated Jun. 19, 2007 in counterpart Canadian patent application 2470782.

"Open-Loop Tanlock Carrier Recovery Structure for BPSK and it's Performance" by Pooi Yuen Kam, Senior Member, IEEE, 1995 IEEE.

"Orthogonal Frequency Division Multiplex Synchronization Technique for Frequency-Selective Fading Channels" by Thomas Keller, Lorenzo Piazzo, Paolo Mandarini, and Lajos Hanzo, Senior Member, IEEE. IEEE Journal on Selected Areas in Communications, vol. 19, No. 6, Jun. 2001.

Canadian Office Action dated May 8, 2008 in Canadian counterpart Application No. 2470782 corresponding to US Appl. No. 10/816,385, filed Apr. 1, 2004 by Feng-Wen Sun et al.

Chinese Office Action dated Aug. 15, 2008 in Chinese counterpart Application No. 200410049081.0 corresponding to U.S. Appl. No. 10/842,325, filed May 10, 2004 by Yimin Jiang, now issued May 6, 2008 as US Patent No. 7,369,633.

EPO Communication dated Oct. 1, 2008 in European Application No. 04253470.1 filed Jun. 10, 2004 by Feng-Wen Sun et al.

Chinese Office Action dated Mar. 27, 2009 in Chinese Patent Application No. 200410049082.5 filed Jun. 11, 2004 by Feng-Wen Sun et al.

Non-final Office Action dated Jul. 20, 2009 in U.S. Appl. No. 12/079,377, filed Mar. 26, 2008 by Yimin Jiang et al.

Chinese Office Action dated Oct. 23, 2009 in Chinese Patent Application No. 200410049082.5 filed Jun. 11, 2004 by Feng-Wen Sun et al.

Ginesi, Alberto; De Gaudenzi, Riccardo; "DVBS2: Carrier Phase Synchronization Techniques for Broadband Satellite Transmissions"; pp. 4-49; Mar. 21, 2003; XP-002274715.

Non-final Office action dated Jan. 5, 2010 in U.S. Appl. No. 12/079,377, filed Mar. 26, 2008 by Yimin Jiang et al.

European Search Report dated Dec. 15, 2009 in European divisional Patent Application No. 09075383.1 filed Jun. 10, 2004 (filing date of parent application 05253470.1, now EP Patent No. 1487146) by Feng-Wen Sun et al.

European Search Report dated Dec. 15, 2009 in European divisional Patent Application No. 09075384.9 filed Jun. 10, 2004 (filing date of parent application 05253470.1, now EP Patent No. 1487146) by Feng-Wen Sun et al.

Chinese Rejection Decision dated Jan. 26, 2011 in Chinese Patent Application No. 200410049082.5 filed Jun. 11, 2004 by Feng-Wen Sun et al.

EPO Communication dated Jan. 11, 2011 in European divisional Application No. 09075383.1 filed Jun. 10, 2004 by Feng-Wen Sun et al.

EPO Decision to Grant dated Apr. 8, 2011 in European divisional Application No. 09075384.9 filed Jun. 10, 2004 by Feng-Wen Sun et al.

Richardson, Thomas; Urbanke, Rudiger L.; "Efficient Encoding of Low Density Parity-Check Codes"; IEEE Transactions on Information Theory; vol. 47, No. 2; Feb. 2001.

Non-final Office action dated Dec. 15, 2011 in U.S. Appl. No. 12/893,843, filed Sep. 29, 2010 by Yimin Jiang et al.

EPO communication of intent to grant dated Nov. 14, 2011 in European divisional Patent Application No. 09075383.1 filed Jun. 10, 2004 by Feng-Wen Sun et al.

* cited by examiner

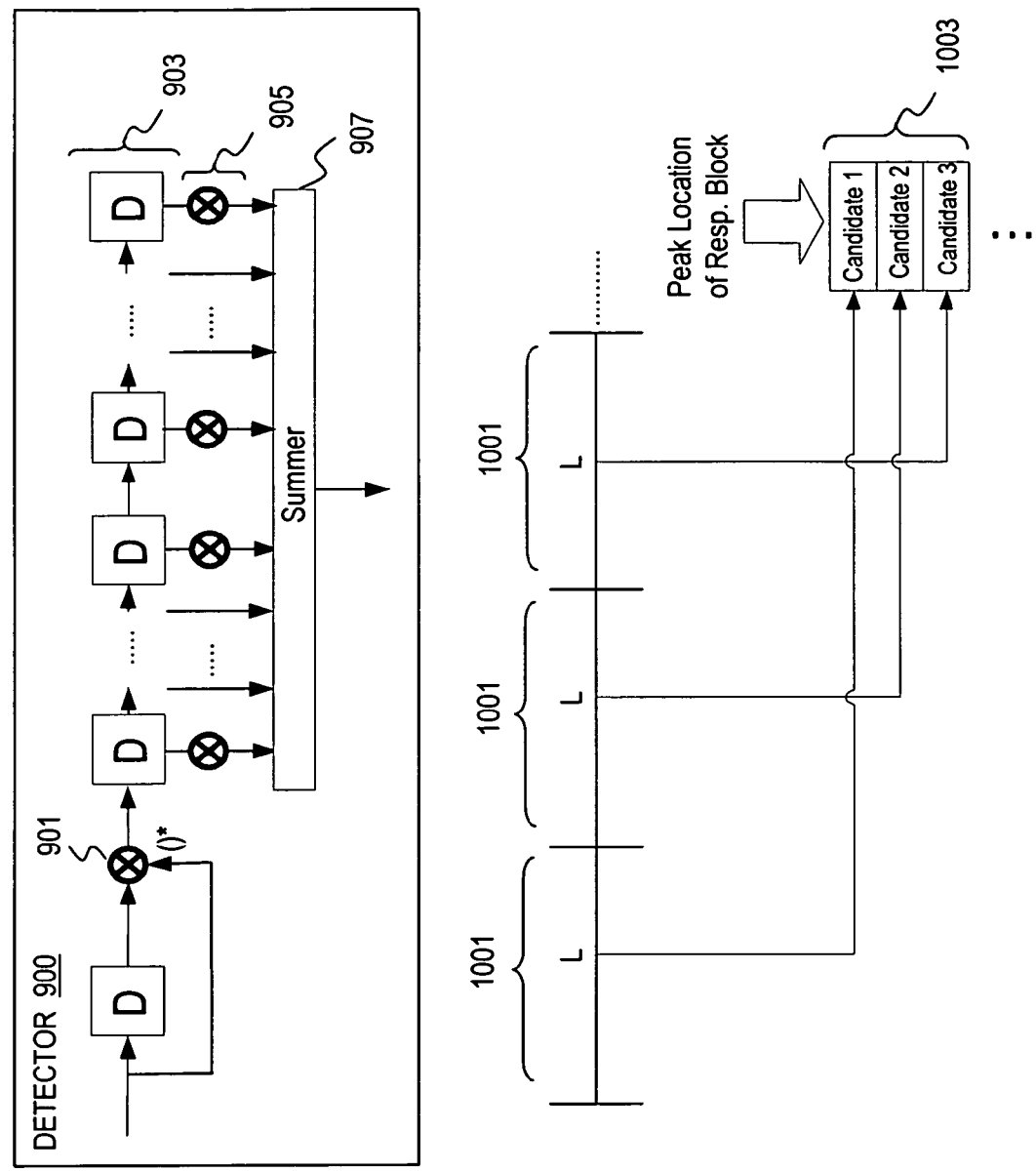

FRAMING STRUCTURE FOR DIGITAL BROADCASTING AND INTERACTIVE SERVICES

RELATED APPLICATIONS

This application claims the benefit of the earlier filing date under 35 U.S.C. §119(e) of U.S. Provisional Application Ser. No. 60/478,376 filed Jun. 13, 2003, titled "Framing and Synchronization for Digital Satellite Broadcasting and Interactive Services," U.S. Provisional Application Ser. No. 60/482,111 filed Jun. 24, 2003, titled "Framing and Synchronization for Digital Satellite Broadcasting and Interactive Services," and U.S. Provisional Application Ser. No. 60/482,117 filed Jun. 24, 2003, titled "Framing Structure and Acquisition Method for Rapid Synchronization"; the entireties of which are incorporated herein by reference.

FIELD OF THE INVENTION

The present invention relates to communication systems, and more particularly to digital communication systems.

BACKGROUND OF THE INVENTION

Broadcast systems have embraced the demand for high quality transmissions made possible by digital technology. The digital revolution has transformed the delivery of broadband services, including audio and video programming as well as data transmission. Satellite communication systems have emerged as a viable solution for supporting such broadband services. As such, power and bandwidth efficient modulation and coding are highly desirable for satellite communications systems to provide reliable communication across noisy communication channels. In broadcast applications supported by such systems, rapid frame synchronization in low signal-to-noise (SNR) environments is necessary to avoid negatively impacting user experience, as well as utilizing system resources efficiently.

Traditionally, frame synchronization has not been an area of major concern for conventional broadcast and/or continuous transmission systems employing convolutional code, largely because decoding can be performed prior to frame synchronization. Consequently, the post decoding frame synchronization can benefit from the coding gain offered by the error correction codes. For instance, the Digital Video Broadcasting via Satellite (DVB-S) standard has been widely adopted worldwide to provide, for example, digital satellite television programming. Traditional DVB compliant systems employ fixed modulation and coding schemes. At present, such DVB compliant systems utilize Quadrature Phase Shift Keying (QPSK) modulation and concatenated convolutional code and Reed-Solomon channel coding. Given the fact that modulation and coding schemes are fixed, and the fact that the continuous transmission nature of broadcasting or unicasting, a simple framing structure can be utilized for these applications. In actuality, the only framing overhead is a Synchronization ("SYNC") byte attached to a MPEG 2 (Moving Pictures Experts Group-2) frame. The SYNC byte is treated the same as other data by the convolutional code and the Reed-Solomon encoder. At the receiving end, the data corrupted by the communication media are first recovered by the convolutional code. The convolutional code can function without the knowledge of the framing structure. The output of the convolutional code is of high fidelity, typically at bit error rate below $1\times10^{-5}$. With the high fidelity output, simple data matching with the SYNC byte is able to identify the starting point of the MPEG frame. Therefore, the transmitted data can be properly reassembled to deliver to the next layer.

However, with block coded systems, frame synchronization is typically achieved before decoding. This is required particularly when the receiver has to determine which modulation and coding is used among a vast amount of potential combinations of modulation and coding schemes. Modern error correction coding, such as low density parity check (LDPC) codes, operates at extremely low signal to noise ratios. This implies that such frame synchronization needs to be achieved at the same low signal-to-noise ratios (S/N or SNR). Furthermore, frame synchronization in such systems extends beyond determining the beginning and ending points of a frame, to determining the modulation and coding scheme employed in the frame.

In view of the foregoing, the conventional approaches to frame synchronization do not operate well in that the requirements of high fidelity outputs, for example, can no longer be guaranteed.

Consequently, other approaches have been developed, but require incurring significant overhead (i.e., reduction in throughput) and receiver complexity. For example, one approach suggests using a forward error correction coding, such as a Bose Chaudhuri Hocquenghem (BCH) code, to protect the framing information within the frame structure. At the receiving end, the receiver searches for the unique word first by correlation. Once the unique word is detected, the BCH coded framing information is decoded coherently by a maximum likelihood correlation decoding. A drawback of this technique is that the unique word has to be large (i.e., high overhead). Another drawback is that true maximum likelihood decoding of the BCH code is quite complex.

Therefore, there is a need for a frame synchronization mechanism that provides rapid acquisition without incurring large overhead costs. There is also a need for a frame synchronization approach that is simple to implement. There is also a need to provide a synchronization technique that is flexible as to provide coding and modulation independence.

SUMMARY OF THE INVENTION

These and other needs are addressed by the present invention, wherein an approach is provided to support frame synchronization in a digital broadcast system utilizing Low Density Parity Check (LDPC) codes. A framing module includes a constellation mapper for mapping a codeword (e.g., generated by a Reed-Muller encoder) specifying framing information of a frame according to a signal constellation to output a data stream. The data stream is split into two data streams. One of the data stream is modified to transmit an additional bit (each of which is multiplied by a constant depending on the information bit transmitted, in the binary domain, this implies that the data stream includes either a duplicate of the original data stream or a binary complement of the original data stream). The two data streams are then combined to form the physical layer signaling code, which is appended to an LDPC coded frame. This approach embeds a framing structure that can assist with synchronization. On the receiving side, a relatively simple frame detector can be used to locate the unique word and physical layer signaling code based on the embedded framing structure of the physical layer signaling code. This information is then supplied to a peak search detection process, which searches for a peak value within a search window, and designates this peak value as a candidate. The search window length can be set according to the modulation scheme employed, if known; otherwise, a default length is used. The peak search can be conducted over multiple search windows, resulting in other candidates. After each search, the candidate is verified by deriving the location of the next peak from the particular candidate. The above arrangement advantageously provides rapid and reliable frame acquisition without additional overhead.

According to one aspect of an embodiment of the present invention, a method for supporting frame synchronization in a digital communication system is disclosed. The method includes mapping a codeword specifying framing information of a frame according to a signal constellation to output a data stream. Additionally, the method includes duplicating and demultiplexing the data stream into a first data stream and a second data stream. The method also includes modifying the first data stream according to a predetermined operation; and multiplexing the modified first data stream with the second data stream. Further, the method includes outputting a physical layer header corresponding to the frame based on the multiplexed data streams.

According to another aspect of an embodiment of the present invention, an apparatus for supporting frame synchronization in a digital communication system is disclosed. The apparatus includes a constellation mapper configured to map a codeword specifying framing information of a frame according to a signal constellation to output a data stream, wherein the data stream is demultiplexed into a first data stream and a second data stream. The apparatus also includes a multiplier coupled to the constellation mapper and configured to modify the first data stream. Further, the apparatus includes a multiplexer configured to combine the modified first data stream with the second data stream, wherein a physical layer header corresponding to the frame is output based the multiplexed data streams.

According to another aspect of an embodiment of the present invention, a method of supporting frame synchronization in a digital broadcast system is disclosed. The method includes encoding framing information of a frame by a forward error correction code to output encoded bits. The method also includes repeating each of the encoded bits. The method further includes modifying the repeated bits according to a predetermined operation to transmit additional framing information.

According to another aspect of an embodiment of the present invention, a method for detecting the start of a frame is disclosed. The method includes receiving a data stream corresponding to a broadcast signal. The data stream includes a unique word and a physical layer header specifying modulation and coding information of the broadcast signal. The method also includes differentiating the data stream; multiplying the differentiated data stream with a predetermined multiplier; summing outputs of the multiplication; adding the summed outputs to yield a plurality of added values; and subtracting the summed outputs to yield a plurality of subtracted values. The method further includes determining a maximum value among absolute values of the added values and the subtracted values.

According to another aspect of an embodiment of the present invention, a device for detecting the start of a frame is disclosed. The device includes means for receiving a data stream corresponding to a broadcast signal. The data stream includes a unique word and a physical layer header specifying modulation and coding information of the broadcast signal. The device also includes means for differentiating the received data stream; means for multiplying the differentiated data stream with a predetermined multiplier; means for summing outputs of the multiplication; means for adding the summed outputs to yield a plurality of added values; means for subtracting the summed outputs to yield a plurality of subtracted values; and means for determining a maximum value among absolute values of the added values and the subtracted values.

According to another aspect of an embodiment of the present invention, a method for recovering framing information of a frame transmitted over in a digital communication system is disclosed. The method includes descrambling a physical layer signaling code of the frame. The physical layer signal code is encoded according to a first order Reed-Muller code and interleaved. The method also includes decoding the physical layer signaling code to derive coding rate, modulation format, and pilot structure of the frame.

According to yet another aspect of an embodiment of the present invention, a method for supporting frame synchronization in a digital communication system is disclosed. The method includes setting a search window length; and determining location of a peak within a frame over the search window length. The frame includes a unique word, a codeword, and a coded segment, wherein the codeword specifies framing information of the coded segment. The method also includes designating the peak location as a candidate; and verifying the candidate. Further, the method includes declaring acquisition of the frame if the candidate is verified.

According to yet another aspect of an embodiment of the present invention, a transmitter includes an encoder configured to output a Low Density Parity Check (LDPC) codeword. The transmitter also includes a framing module configured to generate a LDPC coded frame in response to the LDPC codeword, and to append a physical layer signaling field to the LDPC codeword for specifying modulation and coding information associated with the LDPC coded frame. The physical layer signaling field is encoded with a Forward Error Correction (FEC) code and has an embedded framing structure to assist with frame synchronization.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 9 is a diagram of a differential detector, in accordance with an embodiment of the present invention;

FIG. 10 is a diagram of a peak search detection scheme, in accordance with an embodiment of the present invention;

DESCRIPTION OF THE PREFERRED EMBODIMENT

An apparatus, method, and software for efficiently providing frame synchronization in a digital broadcast system are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
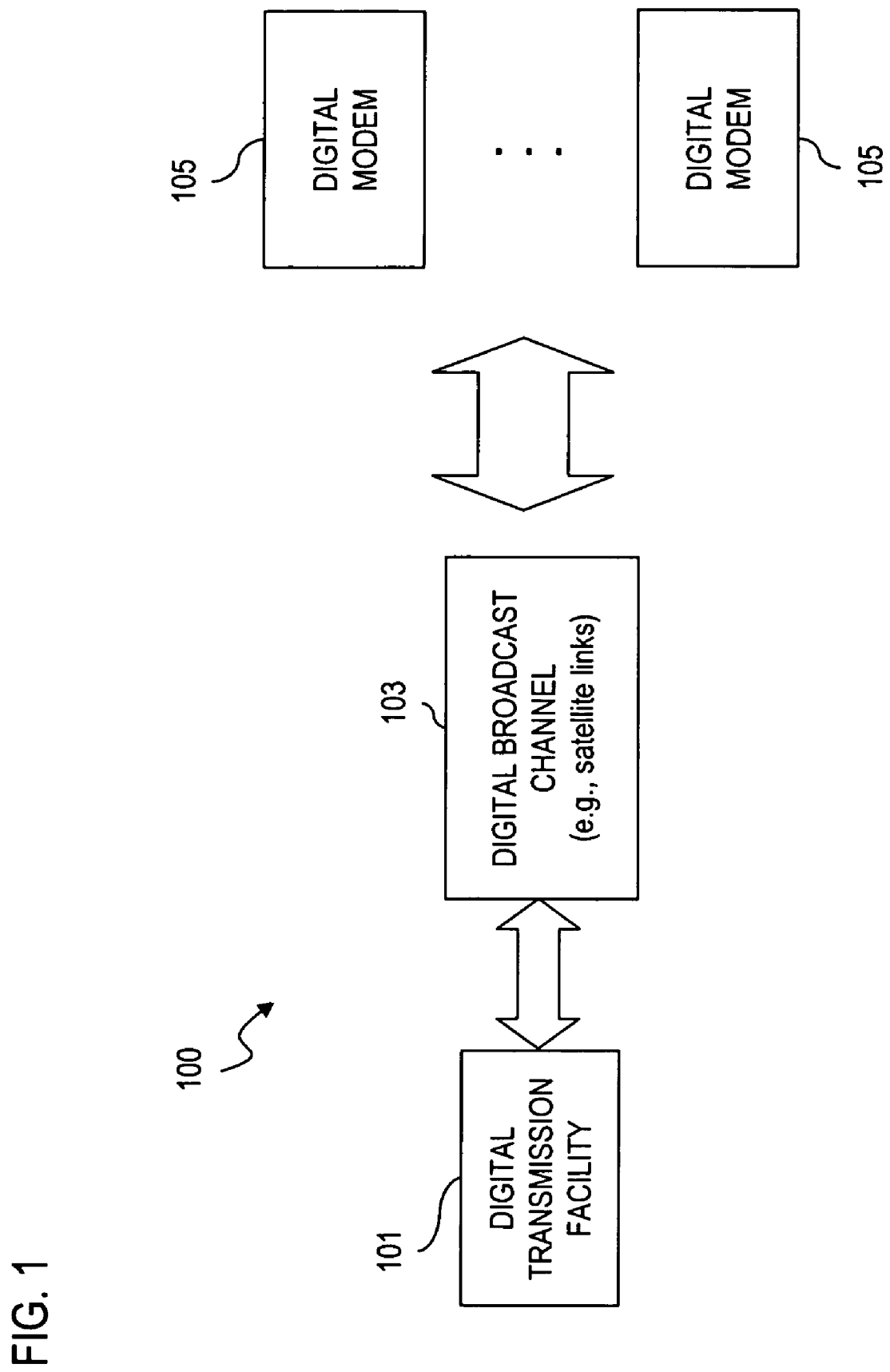
FIG. 1 is a diagram of a digital broadcast system configured to utilize Low Density Parity Check (LDPC) codes, according to an embodiment of the present invention.

FIG. 1 is a diagram of a digital broadcast system configured to utilize Low Density Parity Check (LDPC) codes, according to an embodiment of the present invention. The digital communications system 100 includes a digital transmission facility 101 that generates signal waveforms for broadcast across a communication channel 103 to one or more digital modems 105. According to one embodiment of the present invention, the communication system 100 is a satellite communication system that supports, for example, audio and video broadcast services as well as interactive services. Interactive services include, for example, electronic programming guides (EPGs), high-speed internet access, interactive advertising, telephony, and email services. These interactive services can also encompass such television services as Pay Per View, TV Commerce, Video On Demand, Near Video On Demand and Audio On Demand services. In this environment, the modems 105 are satellite modems.

These modems 105 achieve carrier synchronization by examining the preambles and/or unique words (UW) that are embedded in broadcast data frame structures (shown in FIG. 4), thereby avoiding the use of additional overhead specifically designated for training purposes. The digital modems 105 are more fully described below with respect to FIG. 3.

In this discrete communications system 100, the transmission facility 101 produces a discrete set of possible messages representing media content (e.g., audio, video, textual information, data, etc.); each of the possible messages has a corresponding signal waveform. These signal waveforms are attenuated, or otherwise altered, by communications channel 103. To combat the noise channel 103, the transmission facility 101 utilizes LDPC codes.

The LDPC codes that are generated by the transmission facility 101 enable high speed implementation without incurring any performance loss. These structured LDPC codes output from the transmission facility 101 avoid assignment of a small number of check nodes to the bit nodes already vulnerable to channel errors by virtue of the modulation scheme (e.g., 8PSK). Such LDPC codes have a parallelizable decoding process (unlike turbo codes), which advantageously involves simple operations such as addition, comparison and table look-up. Moreover, carefully designed LDPC codes do not exhibit any sign of error floor.

According to one embodiment of the present invention, the transmission facility 101 generates, using a relatively simple encoding technique as explained below in FIG. 2, LDPC codes based on parity check matrices (which facilitate efficient memory access during decoding) to communicate with the satellite modem 105.

Figure 2:
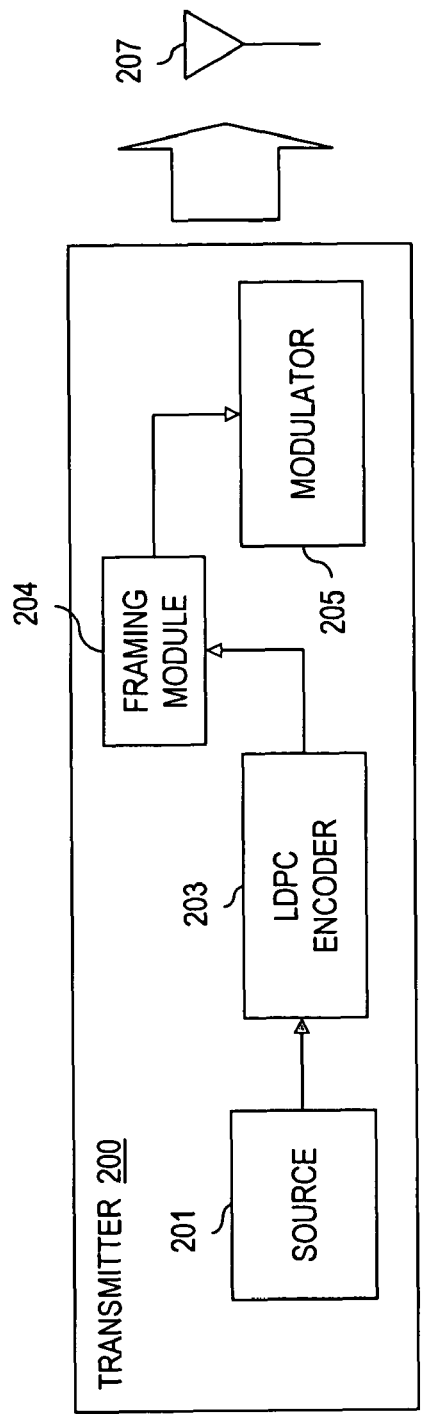
FIG. 2 is a diagram of an exemplary transmitter employed in the digital transmission facility of the system of FIG. 1.

FIG. 2 is a diagram of an exemplary transmitter employed in the digital transmission facility of the system of FIG. 1. A transmitter 200 is utilized in the facility 101 to support, for instance, digital broadcasting and interactive services. An information source 201 provides information bits to an LDPC encoder 203, which outputs coded stream of higher redundancy suitable for error correction processing at the receiver 105. The coded stream is supplied to a framing module 204 to generate a transmission frame, which can include a unique word (UW) and a physical layer signaling header for conveying framing information of the LDPC coded frame.

LDPC codes require, in general, specifying the generator matrices. The LDPC encoder 203 uses a simple encoding technique that makes use of only the parity check matrix by imposing structure onto the parity check matrix. Specifically, a restriction is placed on the parity check matrix by constraining certain portion of the matrix to be triangular. Such a restriction results in negligible performance loss, and therefore, constitutes an attractive trade-off. The construction of such a parity check matrix is described more fully described in a co-pending patent application filed Jul. 3, 2003, and entitled, "Method and System for Providing Low Density Parity Check (LDPC) Encoding"; Ser. No. 10/613,823; the entirety of which is incorporated herein by reference.

Modulator 205 maps the transmission frame from the framing module 204 to signal waveforms that are transmitted to a transmit antenna 207, which emits these waveforms over the communication channel 103. Accordingly, the encoded messages are modulated and distributed to a transmit antenna 207. The transmissions from the transmit antenna 207 propagate to a digital modem, as discussed below. In the case of a satellite communication system, the transmitted signals from the antenna 207 are relayed via a satellite.

Figure 3:
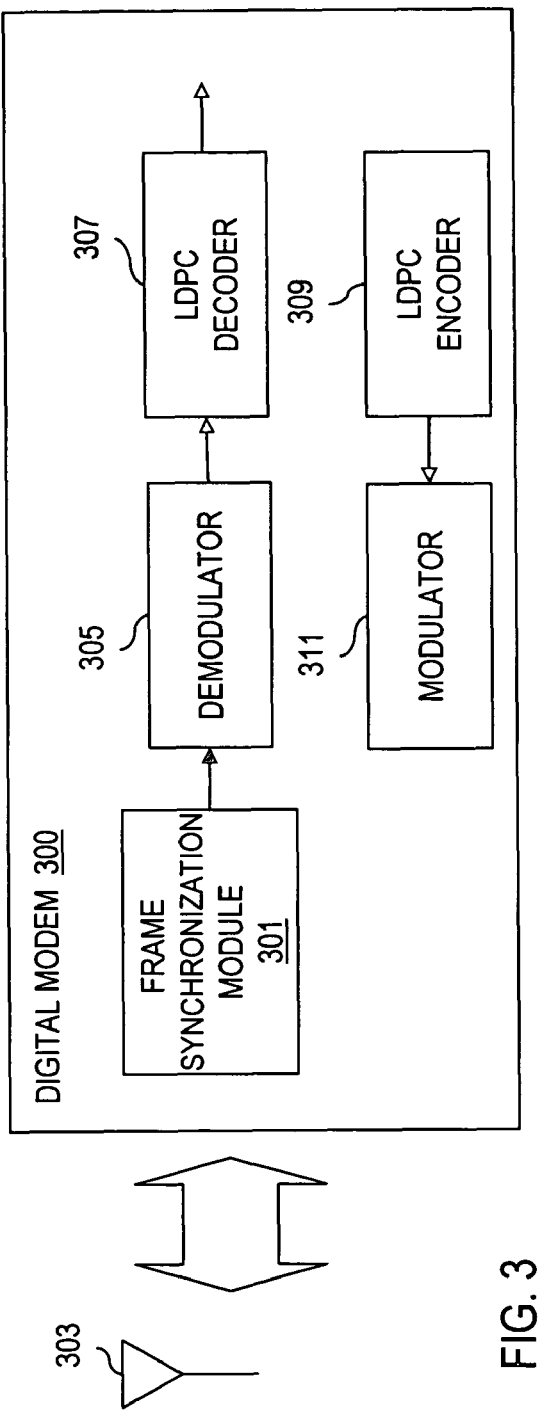
FIG. 3 is a diagram of an exemplary digital modem in the system of FIG. 1.

FIG. 3 is a diagram of an exemplary digital modem in the system of FIG. 1. The digital modem 300, as a modulator/demodulator, supports both transmission and reception of signals from the transmitter 200. According to one embodiment of the present invention, the modem 30 has a frame synchronization module 301 that provides frame acquisition of LDPC encoded signals received from antenna 303. A demodulator 305 performs demodulation of received signals output from the carrier synchronization module 301. After demodulation, the signals are forwarded to a LDPC decoder 307, which attempts to reconstruct the original source messages (i.e., information bits).

On the transmission side, the modem 305 utilizes a LDPC encoder 309 to encode input signals. The encoded signals are then modulated by a modulator 311, which can employ a variety of modulation schemes—e.g., BPSK (Binary Phase Shift Keying), QPSK, 8PSK, 16 APSK (Amplitude Phase Shift Keying), or other higher order modulation.

Alternatively, in a strictly broadcast application, the modulator 311 may not be required, as an end user would not have a need to transmit back to the broadcast network. The modulator 205, as part of the transmitter 200, can reside within a broadcast center, while the demodulator 305 can be deployed in the end user's home. Under this configuration, the end user will have a receive-only terminal.

Figure 4:
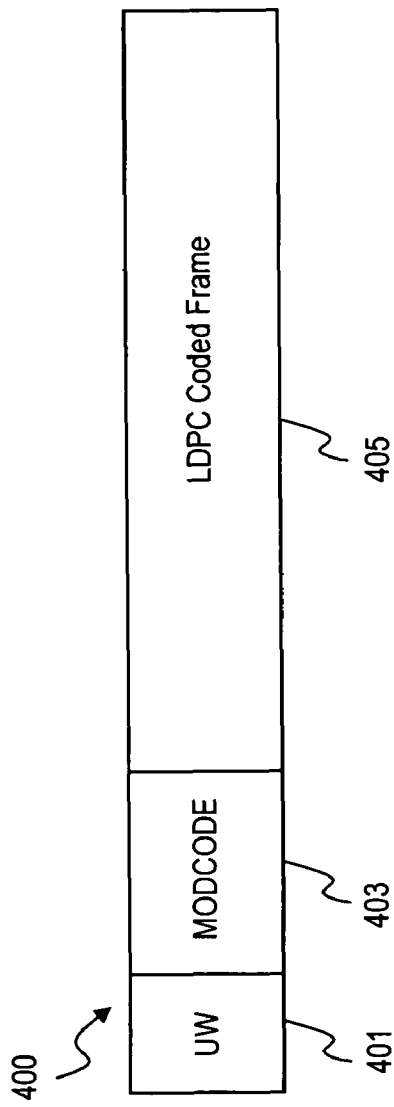
FIG. 4 is a diagram of an exemplary frame structure, in accordance with an embodiment of the present invention.

FIG. 4 shows a diagram of an exemplary frame structure, in accordance with an embodiment of the present invention. By way of example, a frame structure 400 is designed to support digital broadcasting system of FIG. 1. The system 100, as noted, can be deployed as a satellite communication system. As such, the frame structure 400 is compliant with Digital Video Broadcasting (DVB)-S2 standard, which supports, for example, satellite broadcasting and interactive services.

Given the advancement in power, satellite systems can support efficient and dynamic coding and modulation schemes, such as LDPC coding scheme and higher order modulation. By dynamically specifying coding and modulation schemes, the transmission can be adapted to the environment (e.g., rainy conditions, clear skies, etc.) to optimize throughput. However, the dynamic coding and modulation schemes impose significant constraints and requirements on the framing structure. Because the modulation scheme is dynamic, the particular modulation scheme used in the transmission is not known at the receiver. Also, an LDPC code, as a block code, can only be decoded if the coded frame is clearly identified; i.e., the starting and ending point of the frame has to be determined before decoding. Consequently, any framing information inserted into the transmission stream will not be able to be protected by the powerful LDPC coding scheme. Furthermore, due to the power-efficiency of LDPC, the system 100 can operate at extremely low SNRs; for instance, for BPSK rate ½, the LDPC requires only −2 dB Es/No. Given the many possibilities of LDPC codes and modulation schemes, the framing information needs to identify which particular coding and modulation schemes are used for the LDPC coded frame that follows the framing information.

Therefore, it is recognized that that framing information has to be properly embedded to be recoverable at such low signal to noise ratio without the benefit of the LDPC decoder 307. The framing information, as evident from the above discussion, has to efficiently convey information, such as modulation, coding, and pilot structure, beyond merely the start and end of the frame.

As seen in FIG. 4, the framing structure 400 includes a Unique Word (UW) 401, and a physical layer signaling information field 403 that is denoted a MODulation CODE (MODCODE) field. The UW 401 contains a bit pattern that assists with frame synchronization. The UW 401 is fixed and known to the receiver. The MODCODE field 403, in an exemplary embodiment, is a Forward Error Correction (FEC) coded block (e.g., Reed-Muller coding) and conveys the necessary information for the demodulator 305 and the LDPC decoder 307 to function properly to decode the receive signals. For example, the MODCODE field 403 specifies framing information including the rate of the LDPC codes, the modulation scheme as well other information such as the length of the LDPC codes and the pilot configurations. The modulation scheme supported by the frame 400 can include BPSK, QPSK, 8PSK, 16-ary, 32-ary modulation. Because of the information it provides, the MODCODE field is also termed as "physical layer signaling" field.

Clearly, any information that is to be sent through a noisy channel (rather than pure protocol) needs to be protected properly. Accordingly, following the MODCODE field 403 is a LDPC coded frame 405. To support broadcasting and interactive services, the length of the LDPC coded frame 405 can be to 64800 bits, and the combined length of the UW 401 and the MODCODE field 403 is 90 bits.

Conventional wisdom has been that because the MODCODE field 401b varies with the information being carried, such physical layer signaling information field 403 cannot be used for frame detection. According to one embodiment of the present invention, a mechanism is provided to embed a structure within the MODCODE field 403 that can be easily leveraged for detection purposes, without compromising the error correction capability of the MODCODE field 403.

The frame structure 400 advantageously requires low overhead, while providing reliable acquisition. The acquisition scheme for rapid acquisition is more fully described below with respect to FIGS. 7 and 11. It is noted that rapid acquisition is critical for digital video broadcasting applications, in that the viewing experience is affected when a viewer switches from channel to channel.

Therefore, the MODCODE 403 is generated to protect the framing information in such a way that the embedded structure in the framing code can also be utilized for detection and acquisition purpose, as next discussed.

Figure 5:
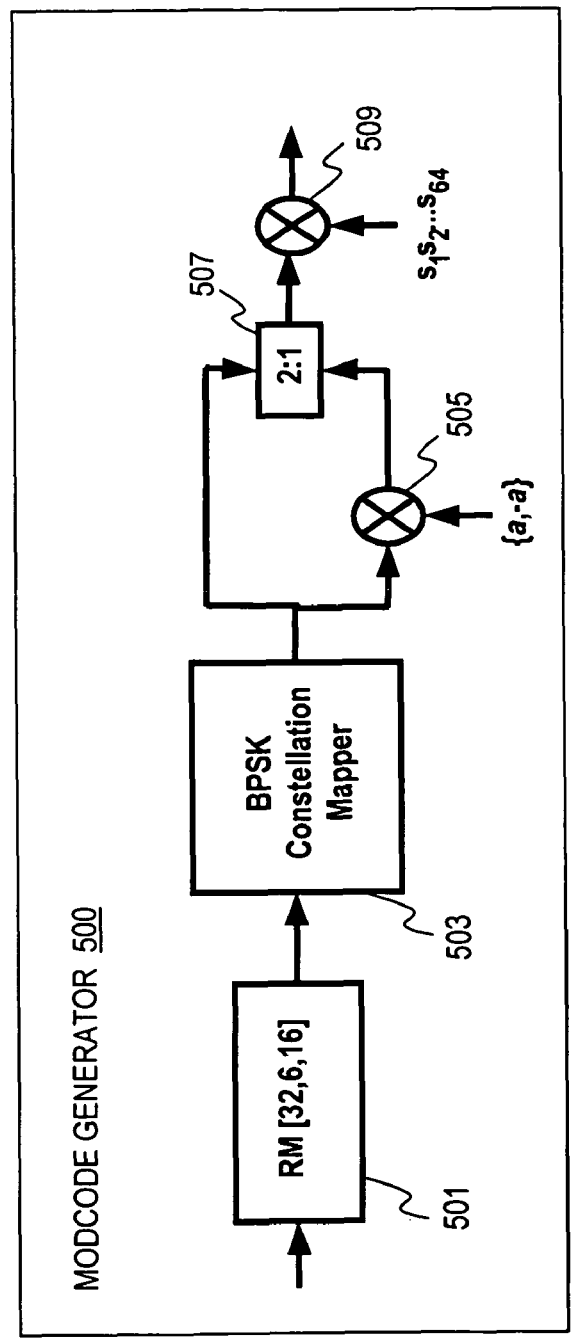
FIG. 5 is a diagram of a physical layer signaling information field generator utilizing a Binary Phase Shift Keying (BPSK) constellation, in accordance with an embodiment of the present invention.

FIG. 5 is a diagram of a physical layer signaling information field generator utilizing a Binary Phase Shift Keying (BPSK) constellation, in accordance with an embodiment of the present invention. From the perspective of frame synchronization, the UW 401 at the beginning of the frame 400 is known and can constitute any sequence with good correlation property. Accordingly, the present invention concentrates on the generation of the physical layer signaling information field 403. In this example, the MODCODE generator 500 can reside in the framing module 204 of the transmitter 204. The generator 500 includes a Reed-Muller (RM) encoder 501 that outputs a bit stream to a BPSK Constellation Mapper 503. The operation of this generator 500 is now described, with respect to FIG. 6.

Figure 6:
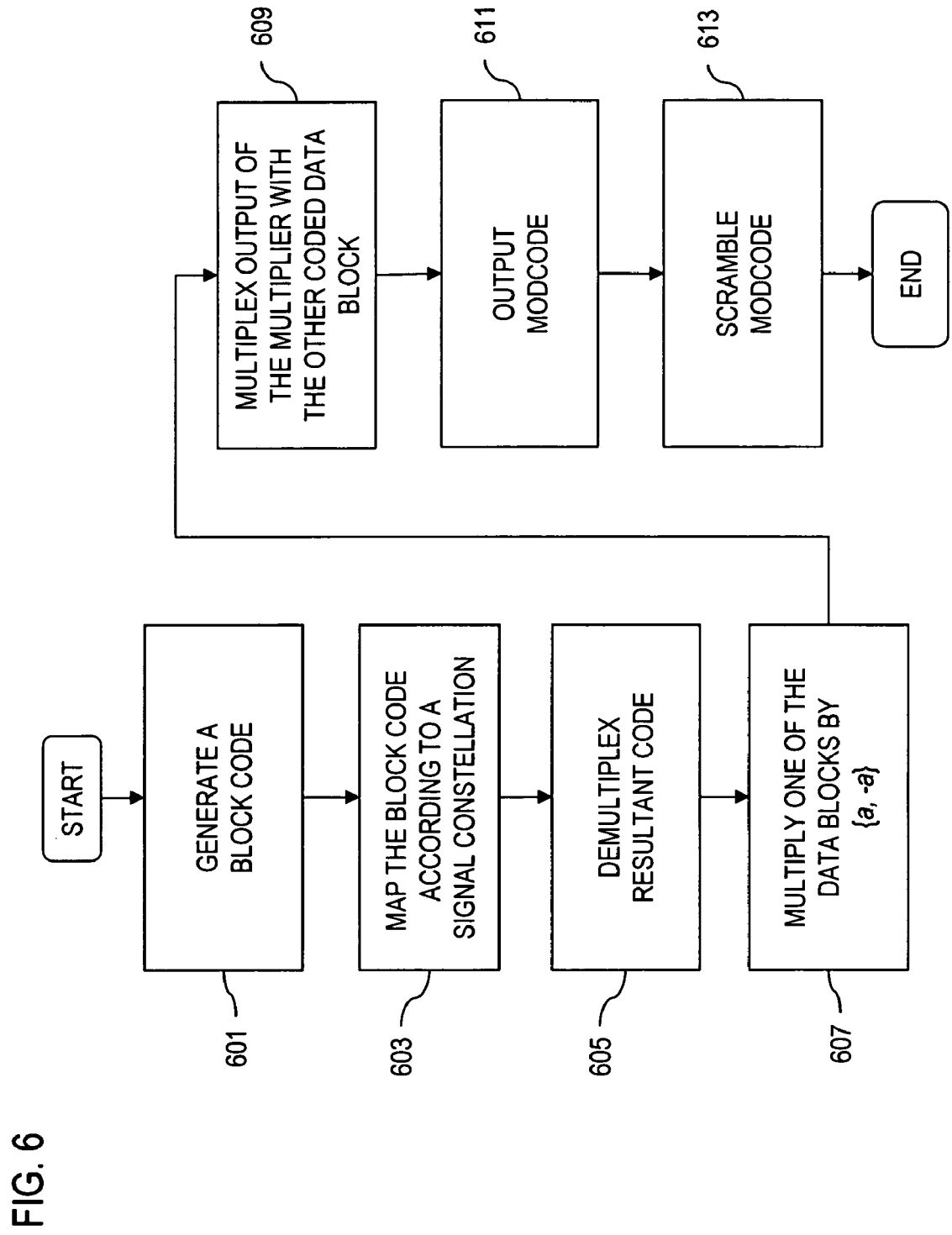
FIG. 6 is a flowchart of the operation of a physical layer signaling information field generator, in accordance with an embodiment of the present invention.

FIG. 6 shows a flowchart of the operation of a physical layer signaling information field generator, in accordance with an embodiment of the present invention. As previously mentioned, the MODCODE 403 conveys information regarding, for example, modulation, FEC code rate, frame length, and configuration of pilot (e.g., whether there is a pilot present). Conceptually, the generator 500 outputs a MODCODE 403 that is an interleaving of a block code and its scrambled version.

In particular, per step 601, a block code is generated, for instance, using the Reed-Muller encoder 501 to create a code [32,6,16] to carry 6 bits of information. An exemplary generator matrix is given as follows:

$$0\ 1\ 0\ 1\ 0\ 1\ 0\ 1\ 0\ 1\ 0\ 1\ 0\ 1\ 0\ 1\ 0\ 1\ 0\ 1\ 0\ 1\ 0\ 1\ 0\ 1\ 0\ 1\ 0\ 1\ 0\ 1$$
$$0\ 0\ 1\ 1\ 0\ 0\ 1\ 1\ 0\ 0\ 1\ 1\ 0\ 0\ 1\ 1\ 0\ 0\ 1\ 1\ 0\ 0\ 1\ 1\ 0\ 0\ 1\ 1\ 0\ 0\ 1\ 1$$
$$0\ 0\ 0\ 0\ 1\ 1\ 1\ 1\ 0\ 0\ 0\ 0\ 1\ 1\ 1\ 1\ 0\ 0\ 0\ 0\ 1\ 1\ 1\ 1\ 0\ 0\ 0\ 0\ 1\ 1\ 1\ 1$$

```
-continued
0 0 0 0 0 0 0 0 1 1 1 1 1 1 1 1 0 0 0 0 0 0 0 0 1 1 1 1 1 1 1 1
0 0 0 0 0 0 0 0 0 0 0 0 0 0 0 0 1 1 1 1 1 1 1 1 1 1 1 1 1 1 1 1
1 1 1 1 1 1 1 1 1 1 1 1 1 1 1 1 1 1 1 1 1 1 1 1 1 1 1 1 1 1 1 1
```

Next, the encoded data is then mapped into BPSK modulation via the BPSK Constellation Mapper 503, as in step 603. It is contemplated that other signal constellations corresponding to different modulation schemes can be utilized; e.g., QPSK. This mapping to a BPSK signal constellation regardless of the modulation scheme of the user data. In step 605, the resultant 32 BPSK symbols are duplicated and demultiplexed into two coded data blocks. It is noted that an additional bit of information can be carried by multiplying, per step 607, the unscrambled coded data block with {a,−a} through a multiplier 505, whereby a can be any constant, and the signs (i.e., positive and negative) of the constant represent logical 0 and logical 1, respectively. It is noted that the sign does not change over the entire block of the duplicated 32 bits.

In step 609, the two data streams are multiplexed back by a multiplexer 507 into one data stream to generate the MODCODE 403 of 64 complex symbols (step 611). This effectively interleaves the two data stream. It is noted that this fundamentally differs from merely repeating the coded symbol, which results in an inferior error correction code—i.e., a linear code of parameters [64,6,32], which can be readily verified not to be optimal. By contrast, the MODCODE 403 output from the generator 500 is equivalent to a permutated [64,7,32] first order Reed-Muller code, which is an optimal code for the given dimension and information rate. Therefore, the error correction capability and the data rate are not compromised. One advantage with the permutated first-order Reed-Muller code is that such a code can be decoded by the well known fast Hadamard transform in a maximal likelihood way. Moreover, the MODCODE 403 can be used for accelerating the acquisition of the frame.

In step 613, the MODCODE 403 is scrambled via a scrambler 509 using, for instance, the following binary sequence:

```
0 1 1 1 0 0 0 1 1 0 0 1 1 1 0 1 1 0 0 0 0 0 1 1 1 1 0 0 1 0 0 1
0 1 0 1 0 0 1 1 0 1 0 0 0 0 1 0 0 0 1 0 1 1 0 1 1 1 1 1 1 0 1 0.
```

This scrambling sequence improves the spectral/correlation property of the interleaved first-order Reed-Muller code. This improved correlation property is critical for detection and acquisition.

From the above discussion, it is observed that if the MODCODE 403 is parsed into 32 pairs of adjacent symbols, the differential of each pair is known up to a scaling constant 1 or −1. This property permits use of the MODCODE 403 for acquisition purposes when the framing information that the MODCODE 403 conveys is unknown. Equivalently, the MODCODE 403 can be described entirely in the binary domain rather than in the modulated domain. In this case, the output of the RM[32,6,16] encoder 501 can be denoted as $(y_1 y_2 \ldots y_{32})$ If the additional bit to be transmitted equals logical 0, then the output before the scrambler is $(y_1 y_1 y_2 y_2 \ldots y_{32} y_{32})$; i.e., each bit is repeated. Whereas if the additional bit to be transmitted equals logical 1, the output before the scrambler 509 is equal to $(y_1 \bar{y}_1 y_2 \bar{y}_2 \ldots y_{32} \bar{y}_{32})$; i.e., the repeated symbol is further binary complemented. The binary scrambled sequence can be mapped into any predetermined modulation scheme, such as BPSK, QPSK etc.

For other system consideration, it is possible to modulate the original and the repeated symbols (or the repeated and binary complemented) in a different format. For instance, according to an alternative embodiment of the present invention, the original and the repeated symbols are both modulated as BPSK; however, the repeated symbol (or repeated and binary complemented) can be rotated by 90 degree. In this way, peak to average ratio can be reduced to improve the efficiency of the power amplifier (not shown) of the transmitter 200.

Figure 7:
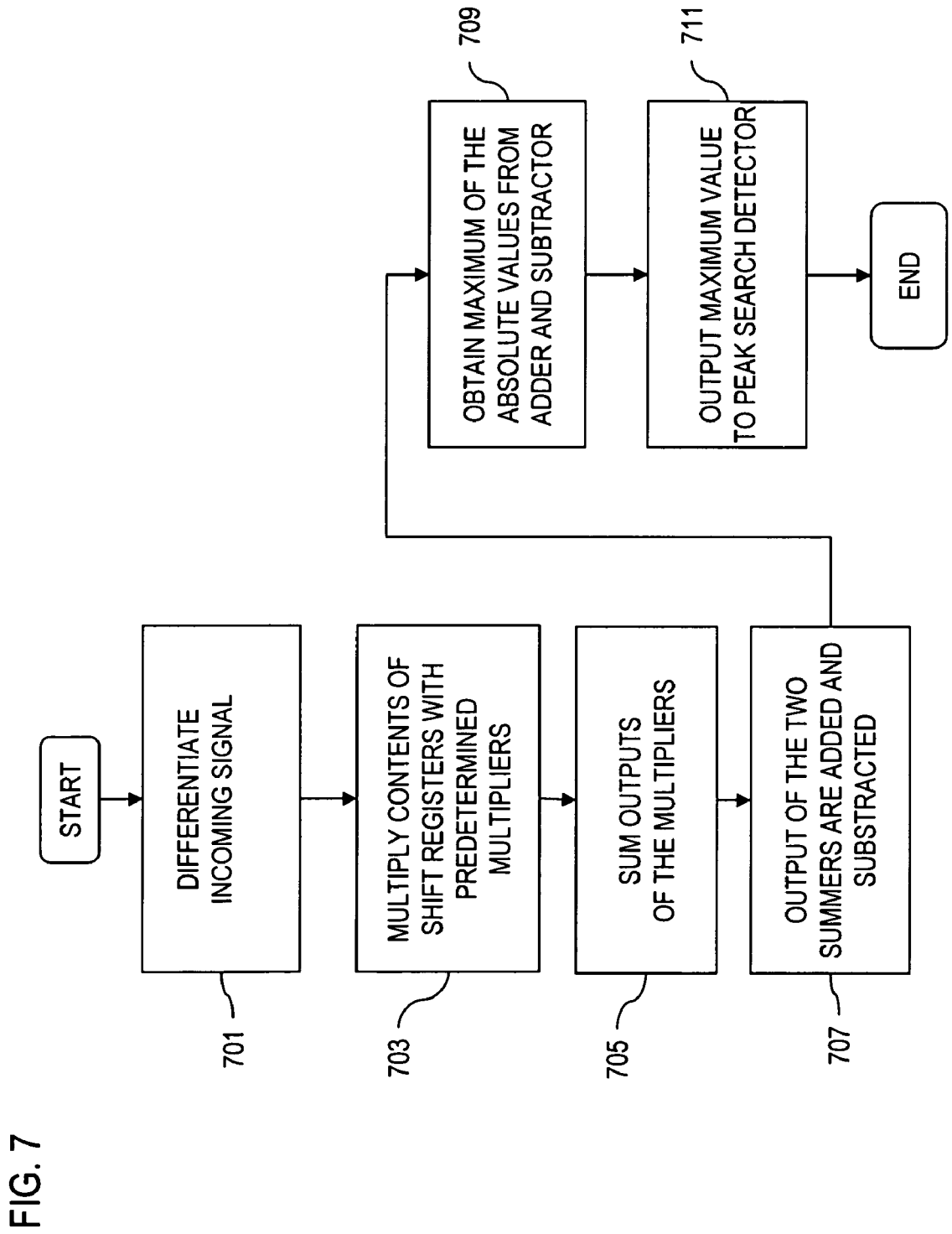
FIG. 7 is a flowchart of a frame detection process, in accordance with an embodiment of the present invention.

FIG. 7 is a flowchart of a frame detection process, in accordance with an embodiment of the present invention. The detection process is explained with respect to the detector 800 shown in FIG. 8. Detection involves locating the Unique Word 401 and the MODCODE field 403. This process can accommodate a relatively large frequency offset (e.g., 10-20 percent of the symbol rate) by employing differential detection. It is assumed, in the system of FIG. 8, that there is one sample per symbol. The process can readily be adapted to multiple samples per symbol, as recognized by those skilled in the art. Two scenarios are considered in the detection process: when the framing information conveyed by the MODCODE is unknown, and when the framing information is known.

Figure 8:
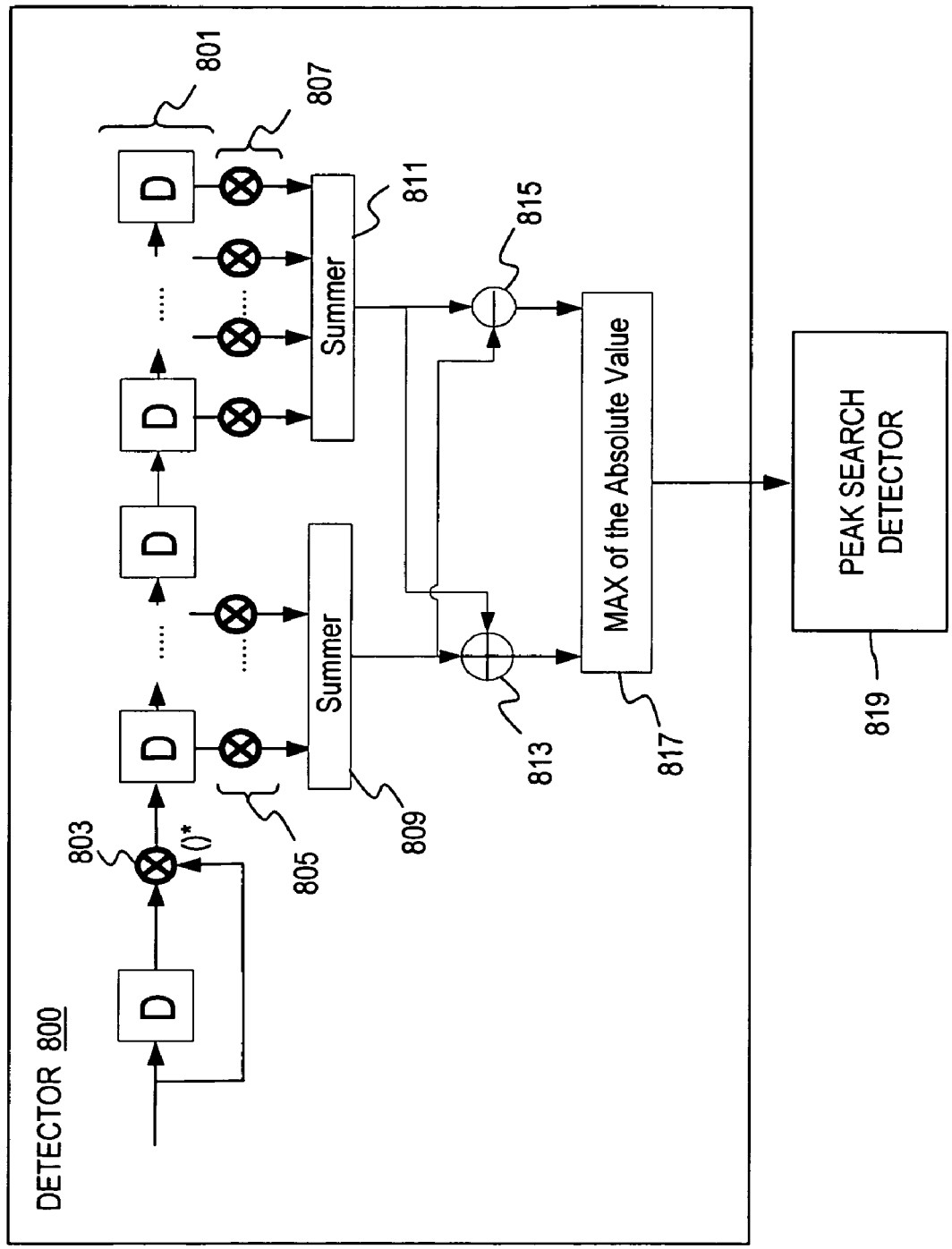
FIG. 8 is a diagram of a detector utilizing physical layer signaling information, in accordance with an embodiment of the present invention.

The operation of the detector 800 and detector 900 (of FIG. 9) respectively take into account of the unknown and known scenarios. As seen in FIG. 8, the incoming signal is first differentiated, as in step 701, by shifting the signal into the shift register 801. That is, the incoming symbol is multiplied via a multiplier 803 by the conjugate of one symbol period delayed signal. The output is then buffered by the shift register 801. Assuming the generator 500 of FIG. 5 is employed, the contents of the rightmost, for example, 25 stages (or cells) of the shift register 801 are multiplied using multipliers, 807 with conjugate of the differentiated unique word, per step 703.

The values of the multipliers 805, 807 can be readily derived and checked as follows. The shift register 801 is initialized with all zeros. The unique word 401 and the MODCODE codeword 403 (including the effect of the scrambling sequence and/or the effect of the potential relative rotation of different modulation scheme for the repeated (and complemented) symbol) are fed into this detection circuit 800, such that when the content of the rightmost cell of the shift register 801 becomes nonzero for the first time, the conjugates of the contents of the cells yield the respective values of the multipliers 805, 807 that the particular cell is connected to. Clearly, these multipliers 805, 807 are fully determined by the way of unique word, MODCODE, scrambling sequence, and the modulation scheme of the physical layer signaling field and can be derived offline. The outputs of the multipliers 805, 807 are summed together, per step 705, through summers 809, 811. In this example, only 32 of the leftmost 64 cells of the shift register 801 are used at any given time. These 32 cells are even spaced and indexed from left to right as cell number 1, 3, ... 63.

The outputs of the two summers 809, 811 are respectively added by adder 813 and subtracted by subtractor 815, as in step 707, to produce two inputs for circuitry 817, which determines the maximum of the absolute values of the two inputs (step 709). This maximum is then output to a peak search detector 819, per step 711. The operation of the peak search detector 819 is more fully described below with respect to FIGS. 10 and 11.

The above process of FIG. 7 and associated detector 800 address the case in which the information of the MODCODE is unknown. The detector 800 can be streamlined if the MODCODE information is known, as shown in FIG. 9

FIG. 9 is a diagram of a differential detector, in accordance with an embodiment of the present invention. The detection scheme supported by a detector 900 when the information carried by the MODCODE is known before acquisition. This information can be made known, for example, by establishing a dedicated channel to transport the configuration information to the receivers; this arrangement is particularly germane to the broadcast system 100. Upon cold start, the receiver (i.e., digital modem 105) can tune into this predefined channel to receive the configuration information. In this case, the information carried by the MODCODE can be inferred from the configuration information, such that the acquisition strategy of the detector 900 can be readily deployed.

As with the detector 800 of FIG. 8, the incoming signal is multiplied using a multiplier 901 with the conjugate of the signal. The difference between the detector 800 and the detector 900 is that the summation is over the shift register 901 after being multiplied by the corresponding differentiated UW 401 and the MODCODE 403. As with the detector 800, the values of the multipliers 905 are determined by initializing the shift register 903 with all zeros and feeding the unique word 401 and the MODCODE 403 into this circuit 900, when the content of the rightmost cell of the shift register becomes nonzero for the first time, the conjugates of the contents of the cells give the respective values of the multipliers 905 that the particular cell is connected to. The outputs of all the multipliers 905 are fed to a common summer 907.

FIG. 10 is a diagram of a peak search detection scheme, in accordance with an embodiment of the present invention. The peak search detector 819 of FIG. 8 essentially searches for a peak value within a search window 1001, and designates this peak value as a candidate by storing the information is a buffer 1003 as, for example, Candidate 1. This search can be conducted over multiple search windows 1001, resulting in other candidates (e.g., Candidate 2 and Candidate 3). After each search, the candidate is verified by deriving the location of the next peak from the particular candidate. If the prediction is correct, an acquisition is declared.

This above process advantageously provides rapid acquisition over the conventional peak search process. The conventional peak search process sets up a threshold once there is one correlation that is above the threshold. In such a case, a candidate is acquired. Thereafter, the process verifies whether it is a valid unique word. This conventional approach is slow because the thresholding can yield numerous candidates, whereby the verification process is executed for each candidate.

Figure 11:
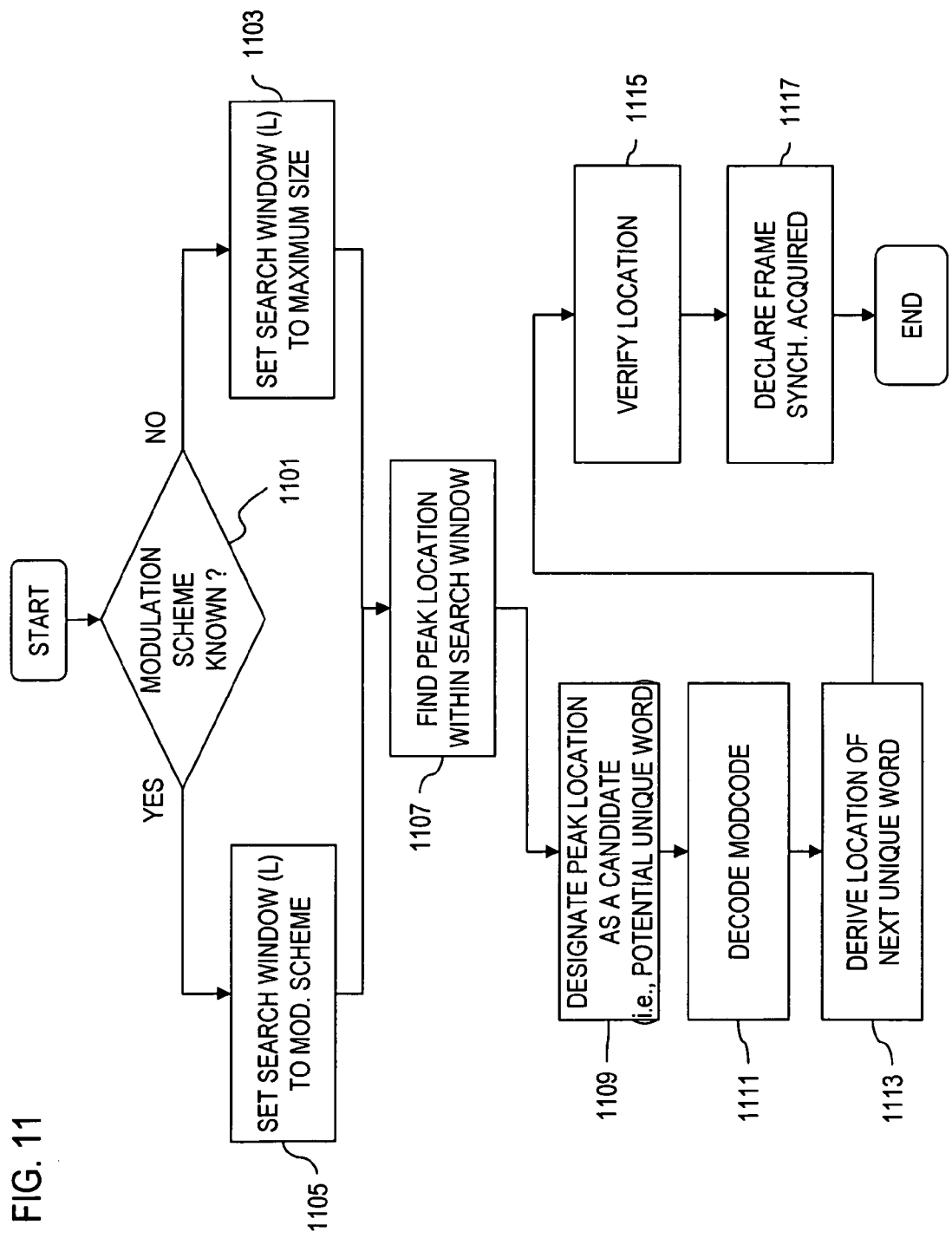
FIG. 11 is a flowchart of a peak search process, in accordance with an embodiment of the present invention.

The details of the peak search process, according to an embodiment of the present invention, are shown in FIG. 11. The design of the peak search process stems from the recognition the system 100 may use different code rates and different modulation schemes (e.g., BPSK, QPSK, 8 PSK, 16 APSK, and etc.). Even though the modulation scheme may not be known in advance, the maximal distance between unique words 401 is known. The peak search process exploits this knowledge, as next explained.

In step 1101, the process determines whether the modulation scheme is known. Such information can be used to define the search window length (L). For example, if the code length of the LDPC is fixed at 64800 bits, for BPSK, the distance between two unique words is 64800 bits. For QPSK, the length is 32400 bits, and for 8 PSK, the length is 21600 bits. Thus, for the contemplated modulation schemes, the maximum size would be based on the length of the LDPC frame. Accordingly, the search window, L, can be set as the length of the LDPC frame plus the length of UW 401 and the MODCODE 403 (e.g., 64800+90) in the case that modulation scheme is not known before hand, per step 1103. However, if the modulation scheme is known, the search window is set to match the length of the frame for the particular modulation scheme, as in step 1105. The peak search detector 819, per step 1107, finds a peak with the specified the search window. The search is conducted for the peak within this window even though there can be multiple unique word 401 and MODCODE 403 with a search window. The manner in which the search window is set guarantees that at least one unique word 401 exists is within the search window (as shown in FIG. 10).

Next, the peak location within the search window is designated as a candidate, per step 1109. For each candidate, the MODCODE 403 is decoded if the modulation and coding information is not yet available (per step 1111). Based on the modulation and coding scheme, next unique word location is derived, as in step 1113. Thereafter, the process verifies, per step 1115, whether the predicated location is indeed the UW 401 and the MODCODE 403. If the next consecutive predicted locations (e.g., two) are verified as the UW 401 and the MODCODE 403, then the process declares that frame synchronization is acquired.

The above process can be performed serially or in parallel with respect to the candidates until one of them is successfully verified.

Figure 12:
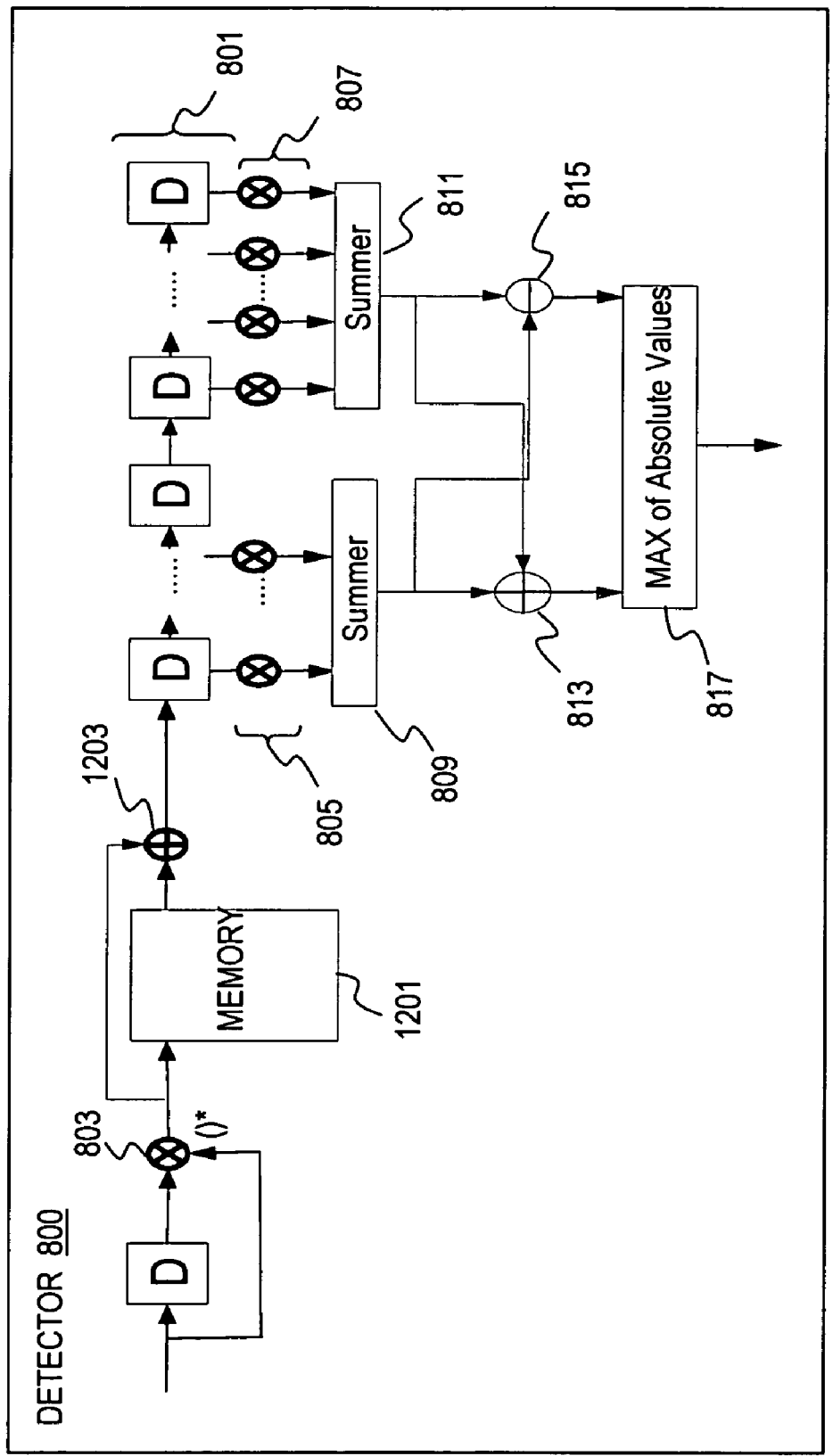
FIG. 12 is a diagram of the detector of FIG. 8 modified for buffering and accumulation, in accordance with an embodiment of the present invention.

FIG. 12 is a diagram of the detector of FIG. 8 modified for buffering and accumulation, in accordance with an embodiment of the present invention. The detector 800 can be modified to incorporate a memory 1201 and an accumulator 1203. After the first differential multiplier 803, the data of length L is buffered in the memory 1201, and the next block of data of L is summed by the accumulator 1203 together with the buffered data. This modification improves the acquisition speed of the detector 800. In a LDPC system, the LDPC decoder 307 has readily available memory for the decoding process; thus, such memory can be utilized for the buffering of the detector 800. That is, the memory 1201 can be shared with the decoder 307, thereby avoiding additional cost.

Figure 13:
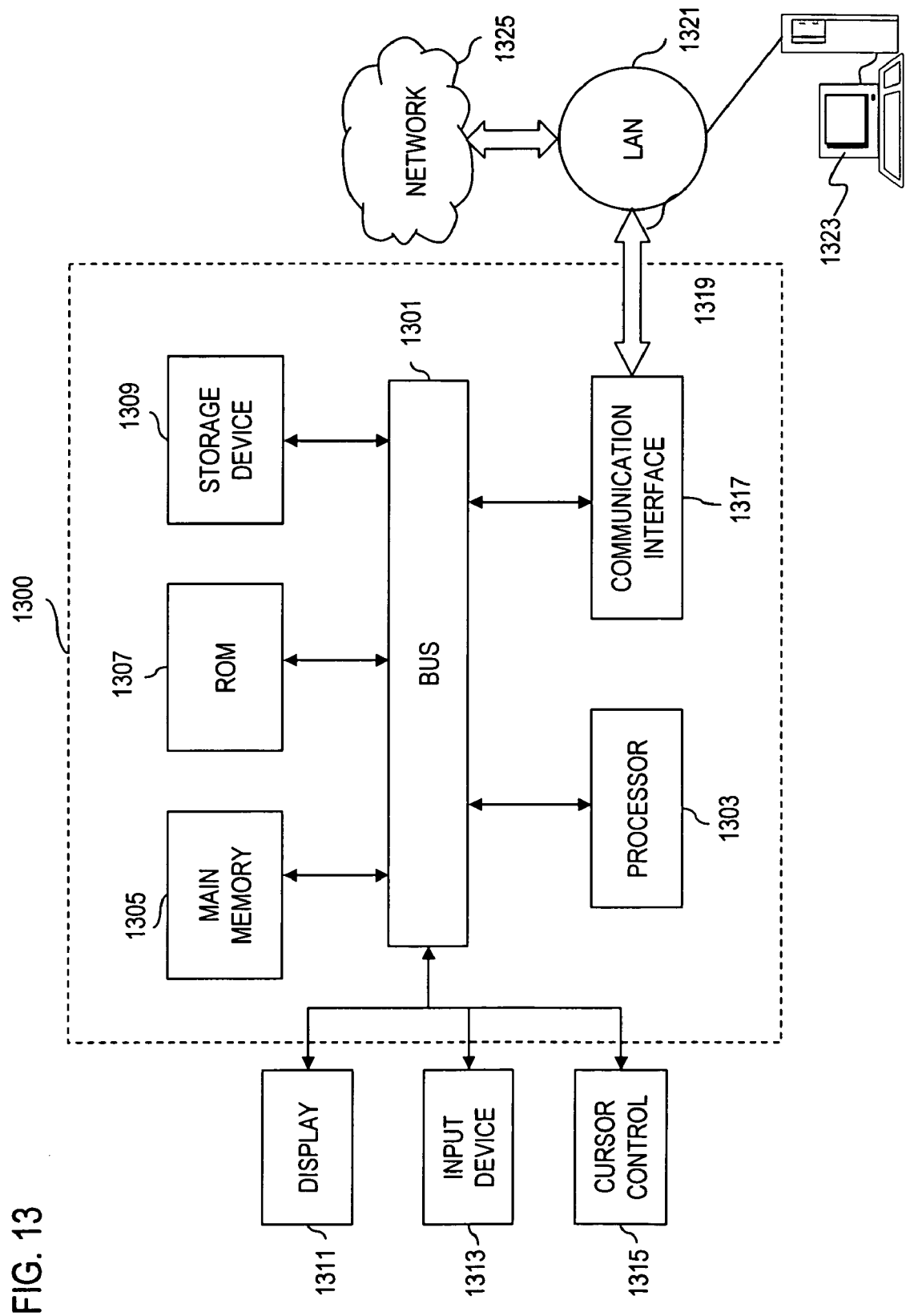
FIG. 13 is a diagram of a computer system that can perform the various processes associated with frame synchronization, in accordance with embodiments of the present invention.

FIG. 13 illustrates a computer system upon which an embodiment according to the present invention can be implemented. The computer system 1300 includes a bus 1301 or other communication mechanism for communicating information, and a processor 1303 coupled to the bus 1301 for processing information. The computer system 1300 also includes main memory 1305, such as a random access memory (RAM) or other dynamic storage device, coupled to the bus 1301 for storing information and instructions to be executed by the processor 1303. Main memory 1305 can also be used for storing temporary variables or other intermediate information during execution of instructions to be executed by the processor 1303. The computer system 1300 further includes a read only memory (ROM) 1307 or other static storage device coupled to the bus 1301 for storing static information and instructions for the processor 1303. A storage device 1309, such as a magnetic disk or optical disk, is additionally coupled to the bus 1301 for storing information and instructions.

The computer system 1300 may be coupled via the bus 1301 to a display 1311, such as a cathode ray tube (CRT), liquid crystal display, active matrix display, or plasma display, for displaying information to a computer user. An input device 1313, such as a keyboard including alphanumeric and other keys, is coupled to the bus 1301 for communicating information and command selections to the processor 1303. Another type of user input device is cursor control 1315, such as a mouse, a trackball, or cursor direction keys for communicating direction information and command selections to the processor 1303 and for controlling cursor movement on the display 1311.

According to one embodiment of the invention, the various frame synchronization processes can be provided by the computer system 1300 in response to the processor 1303 executing an arrangement of instructions contained in main memory 1305. Such instructions can be read into main memory 1305 from another computer-readable medium, such as the storage device 1309. Execution of the arrangement of instructions contained in main memory 1305 causes the processor 1303 to perform the process steps described herein. One or more processors in a multi-processing arrangement may also be employed to execute the instructions contained in main memory 1305. In alternative embodiments, hard-wired module may be used in place of or in combination with software instructions to implement the embodiment of the present invention. Thus, embodiments of the present invention are not limited to any specific combination of hardware module and software.

The computer system 1300 also includes a communication interface 1317 coupled to bus 1301. The communication interface 1317 provides a two-way data communication coupling to a network link 1319 connected to a local network 1321. For example, the communication interface 1317 may be a digital subscriber line (DSL) card or modem, an integrated services digital network (ISDN) card, a cable modem, or a telephone modem to provide a data communication connection to a corresponding type of telephone line. As another example, communication interface 1317 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1317 sends and receives electrical, electromagnetic, or optical signals that carry digital data streams representing various types of information. Further, the communication interface 1317 can include peripheral interface devices, such as a Universal Serial Bus (USB) interface, a PCMCIA (Personal Computer Memory Card International Association) interface, etc.

The network link 1319 typically provides data communication through one or more networks to other data devices. For example, the network link 1319 may provide a connection through local network 1321 to a host computer 1323, which has connectivity to a network 1325 (e.g. a wide area network (WAN) or the global packet data communication network now commonly referred to as the "Internet") or to data equipment operated by service provider. The local network 1321 and network 1325 both use electrical, electromagnetic, or optical signals to convey information and instructions. The signals through the various networks and the signals on network link 1319 and through communication interface 1317, which communicate digital data with computer system 1300, are exemplary forms of carrier waves bearing the information and instructions.

The computer system 1300 can send messages and receive data, including program code, through the network(s), network link 1319, and communication interface 1317. In the Internet example, a server (not shown) might transmit requested code belonging to an application program for implementing an embodiment of the present invention through the network 1325, local network 1321 and communication interface 1317. The processor 1303 may execute the transmitted code while being received and/or store the code in storage device 139, or other non-volatile storage for later execution. In this manner, computer system 1300 may obtain application code in the form of a carrier wave.

The term "computer-readable medium" as used herein refers to any medium that participates in providing instructions to the processor 1303 for execution. Such a medium may take many forms, including but not limited to non-volatile media, volatile media, and transmission media. Non-volatile media include, for example, optical or magnetic disks, such as storage device 1309. Volatile media include dynamic memory, such as main memory 1305. Transmission media include coaxial cables, copper wire and fiber optics, including the wires that comprise bus 1301. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Accordingly, the various embodiments of the present invention provide an approach for achieving frame synchronization in a digital broadcast system utilizing Low Density Parity Check (LDPC) codes. A framing module includes a constellation mapper for mapping a codeword (e.g., generated by a Reed-Muller encoder) specifying framing information of a frame according to a signal constellation to output a data stream. The data stream is split into two data streams. One of the data stream is modified to interleave additional bits (each of which is either a duplicate bit or a binary complement bit). The two data streams are then combined to form the physical layer header, which is appended to an LDPC coded frame. This approach embeds a framing structure that can assist with synchronization. On the receiving side, a relatively simple frame detector can be used to locate the unique word and physical layer header based on the embedded framing structure of the physical layer header. This information is then supplied to a peak search detection process, which searches for a peak value within a search window, and designates this peak value as a candidate. The search window length can be set according to the modulation scheme employed, if known; otherwise, a default length is used. The peak search can be conducted over multiple search windows, resulting in other candidates. After each search, the candidate is verified by deriving the location of the next peak from the particular candidate. The above arrangement advantageously provides rapid and reliable frame acquisition without additional overhead.

While the present invention has been described in connection with a number of embodiments and implementations, the present invention is not so limited but covers various obvious modifications and equivalent arrangements, which fall within the purview of the appended claims.

What is claimed is:

1. A method performed by a transmitter for supporting frame synchronization in a digital communication system, the method comprising the steps of:
mapping a codeword specifying framing information of a frame according to a signal constellation to output a data stream of symbols, wherein the frame is a Low Density Parity Check (LDPC) coded frame;
duplicating and demultiplexing each of the symbols into a first data stream of duplicate symbols and a second data stream of symbols;
modifying the first data stream of duplicate symbols according to a predetermined operation to generate modified first data stream of duplicate symbols, wherein the predetermined operation includes multiplying the first stream of duplicate symbols with {−a} or {a}, a being a predetermined constant and the sign of the multiplier represents a portion of the framing information;
multiplexing the modified first data stream of duplicate symbols with the second data stream of symbols to interleave the second data stream of symbols with the modified first data stream of duplicate symbols and generate a frame synchronization structure; and
outputting a physical layer signaling header including the frame synchronization structure for the frame based on the multiplexed and modified first data stream of duplicate symbols and second data stream of symbols for transmission in the digital communication system.

2. A method according to claim 1, wherein the signal constellation is independent of a modulation scheme of the frame.

3. A method performed by a transmitter for supporting frame synchronization in a digital communication system, the method comprising the steps of:
mapping a codeword specifying framing information of a frame according to a signal constellation to output a data stream of symbols;
duplicating and demultiplexing each of the symbols into a first data stream of duplicate symbols and a second data stream of symbols;
modifying the first data stream of duplicate symbols according to a predetermined operation to generate modified first data stream of duplicate symbols, the predetermined operation including multiplying the first stream of duplicate symbols with {−a} or {a}, a, a being a predetermined constant, wherein the sign of the multiplier represents a portion of the framing information;
multiplexing the modified first data stream of duplicate symbols with the second data stream of symbols to interleave the second data stream of symbols with the modified first data stream of duplicate symbols and generate a frame synchronization structure; and
outputting a physical layer signaling header including the frame synchronization structure for the frame based on the multiplexed and modified first data stream of duplicate symbols and second data stream of symbols for transmission in the digital communication system.

4. A method performed by a transmitter for supporting frame synchronization in a digital communication system, the method comprising the steps of:
mapping a codeword specifying framing information of a frame according to a signal constellation to output a data stream of symbols;
duplicating and demultiplexing each of the symbols into a first data stream of duplicate symbols and a second data stream of symbols;
modifying the first data stream of duplicate symbols according to a predetermined operation to generate modified first data stream of duplicate symbols, wherein the predetermined operation includes multiplying the first stream of duplicate symbols with {−a} or {a}, a, a being a predetermined constant, and the sign of the multiplier represents a portion of the framing information, and the modified first data stream of duplicate symbols are phase rotated relative to the second data stream of symbols;
multiplexing the modified first data stream of duplicate symbols with the second data stream of symbols to interleave the second data stream of symbols with the modified first data stream of duplicate symbols and generate a frame synchronization structure; and
outputting a physical layer signaling header including the frame synchronization structure for the frame based on the multiplexed and modified first data stream of duplicate symbols and second data stream of symbols for transmission in the digital communication system.

5. A method according to claim 1, further comprising the step of:
generating the codeword according to a first order Reed-Muller code.

6. A method according to claim 1, wherein the framing information specifies a modulation scheme, and a coding scheme.

7. A method according to claim 1, further comprising the step of: scrambling the multiplexed data stream of symbols.

8. A method according to claim 1, wherein the signal constellation is according to a Binary Phase Shift Keying (BPSK) scheme.

9. A non-transitory computer-readable medium bearing instructions for supporting frame synchronization in a digital communication system, said instruction, being arranged, upon execution, to cause one or more processors to perform the method of claim 1.

10. A transmitter apparatus for supporting frame synchronization in a digital communication system, the apparatus comprising:
a constellation mapper configured to map a codeword specifying framing information of a frame according to a signal constellation to output a data stream of symbols, to duplicate and demultiplex each of the symbols into a first data stream of duplicate symbols and a second data stream of symbols, wherein the frame is a Low Density Parity Check (LDPC) coded frame;

a multiplier coupled to the constellation mapper and configured to modify the first data stream of duplicate symbols according to a predetermined operation to generate modified first data stream of duplicate symbols, wherein the predetermined operation includes multiplying the first stream of duplicate symbols with {−a} or {a}, a, a being a predetermined constant, and the sign of the multiplier represents a portion of the framing information;

a multiplexer configured to multiplex the modified first data stream of duplicate symbols with the second data stream of symbols to interleave the second data stream of symbols with the modified first data stream of duplicate symbols and generate a frame synchronization structure, wherein a physical layer signaling header including the frame synchronization structure for the frame is output based on the multiplexed and modified first data stream of duplicate symbols and second data stream of symbols for transmission in the digital communication system.

11. An apparatus according to claim 10, wherein the signal constellation is independent of a modulation scheme of the frame.

12. A transmitter apparatus for supporting frame synchronization in a digital communication system, the apparatus comprising:

a constellation mapper configured to map a codeword specifying framing information of a frame according to a signal constellation to output a data stream of symbols, to duplicate and demultiplex each of the symbols into a first data stream of duplicate symbols and a second data stream of symbols, wherein the frame is a Low Density Parity Check (LDPC) coded frame;

a multiplier coupled to the constellation mapper and configured to modify the first data stream of duplicate symbols by multiplying the first data stream of duplicate symbols with {−a} or {a} to generate modified first data stream of duplicate symbols, a being a predetermined constant, wherein the sign of the multiplier represents a portion of the framing information; and a multiplexer configured to multiplex the modified first data stream of duplicate symbols with the second data stream of symbols to interleave the second data stream of symbols with the modified first data stream of duplicate symbols and generate a frame synchronization structure, wherein a physical layer signaling header including the frame synchronization structure for the frame is output based on the multiplexed and modified first data stream of duplicate symbols and second data stream of symbols for transmission in the digital communication system.

13. A transmitter apparatus for supporting frame synchronization in a digital communication system, the apparatus comprising:

a constellation mapper configured to map a codeword specifying framing information of a frame according to a signal constellation to output a data stream of symbols, to duplicate and demultiplex each of the symbols into a first data stream of duplicate symbols and a second data stream of symbols;

a multiplier coupled to the constellation mapper and configured to modify bits of the first data stream of duplicate symbols according to a predetermined operation to generate modified first data stream of duplicate symbols having bits that are phase rotated relative to bits of the second data stream of symbols, wherein the predetermined operation includes multiplying the first stream of duplicate symbols with {−a} or {a}, a being a predetermined constant, and the sign of the multiplier represents a portion of the framing information;

a multiplexer configured to interleave the bits of the modified first data stream of duplicate symbols with the bits of the second data stream of symbols to generate a frame synchronization structure, wherein a physical layer signaling header including the frame synchronization structure for the frame is output based on the multiplexed and modified first data stream of duplicate symbols and second multiplexed data stream of symbols for transmission in the digital communication system.

14. An apparatus according to claim 10, further comprising:

a code generator coupled to the constellation mapper and configured to generate the codeword according to a first order Reed-Muller code.

15. An apparatus according to claim 10, wherein the framing information specifies a modulation scheme, and a coding scheme.

16. An apparatus according to claim 10, further comprising: a scrambler configured to scramble the multiplexed data stream of symbols.

17. An apparatus according to claim 10, wherein the signal constellation is according to a Binary Phase Shift Keying (BPSK) scheme.

18. A method according to claim 1, wherein the data stream of symbols includes a unique word to assist with synchronization.

19. An apparatus according to claim 10, wherein the data stream of symbols includes a unique word to assist with synchronization.

* * * * *